United States Patent [19]

Fukuda et al.

[11] Patent Number: 4,968,656

[45] Date of Patent: Nov. 6, 1990

[54] MIXED OXIDE CATALYST AND COATING OR POROUS MATERIAL COMPRISING THE SAME

[75] Inventors: Akio Fukuda, Takaichi; Yasunori Kaneko, Shiki; Mamoru Isogai, Yamatokohriyama; Makiko Waki, Nara, all of Japan

[73] Assignee: Matsushita Electric Industrial Co., Ltd., Osaka, Japan

[21] Appl. No.: 359,721

[22] Filed: May 31, 1989

[30] Foreign Application Priority Data

Jun. 1, 1988 [JP] Japan ................................. 63-134984

[51] Int. Cl.$^5$ ...................... B01J 23/10; B01J 23/34; B01J 23/72
[52] U.S. Cl. ..................................... 502/244; 502/304
[58] Field of Search .............. 502/244, 304; 126/19 R

[56] References Cited

U.S. PATENT DOCUMENTS

| | | | |
|---|---|---|---|
| 1,939,708 | 12/1933 | Larson | 23/237 |
| 3,460,523 | 8/1969 | Stiles et al. | 126/19 |
| 3,993,597 | 11/1976 | Stiles | 502/244 X |
| 4,029,603 | 6/1977 | Denny et al. | 502/244 X |
| 4,147,835 | 4/1979 | Nishino et al. | 428/450 |
| 4,405,823 | 9/1983 | Maki et al. | 568/801 |

FOREIGN PATENT DOCUMENTS 2114669 6/1972 France .

Primary Examiner—W. J. Shine
Attorney, Agent, or Firm—Wenderoth, Lind & Ponack

[57] ABSTRACT

A mixed oxide comprising oxides of Ce, Cu and Mn wherein an atomic ratio of Ce to a total atom number of Cu and Mn is from 1:2 to 2:1 and the metals are present in the mixed oxide in the oxide forms of $CeO_2$ and $Cu_xMn_{3-x}O_4$ wherein x is a number larger than 0 (zero) and less than 3, which can catalyze the oxidation of organic materials.

8 Claims, 5 Drawing Sheets

MIXED OXIDE CATALYST AND COATING OR POROUS MATERIAL COMPRISING THE SAME

BACKGROUND OF THE INVENTION

1. Field of the Invention

The present invention relates to a mixed oxide and a coating or a porous material comprising the same. More particularly, the present invention relates to a mixed oxide which can thermally decompose stains which are formed from foods, seasonings and the like to be cooked on cooking utensils, a coating comprising said mixed oxide or a porous material comprising said mixed oxide.

2. Description of the Related Art

U.S. Pat. No. 3,460,523 discloses a coating containing an oxidation catalyst comprising an oxide of zirconium, titanium, vanadium, chromium, manganese, iron, cobalt, nickel, tungsten, molybdenum, copper, zinc or a rare earth element, or a noble metal as well as a mixture of the oxide and the noble metal, which catalyst catalyzes the oxidative destruction of the stains of cooked material while heating. The disclosed catalyst accelerates the oxidation of organic materials such as oil, proteins, fats, etc. The suitable ones are oxides of manganese, cobalt, iron, nickel, chromium, tungsten and molybdenum and their mixtures. Among them, the most suitable ones are the compounds in which at least one of the above elements is present in at least two valence states or the compounds in which at least one of the above elements have at least two valence states in a transition period during the oxidation reaction. The above U.S. Patent describes that the coating having the catalytic activity can be obtained by mixing said oxidation catalyst with a silicate such as sodium silicate.

However, the disclosed catalyst has some drawbacks. For example, when a coating is formed from sodium silicate, aluminum phosphate or glass frit and at least one of the oxides of Mn, Co, Fe, Ni, Cu, La and Ce, and salad oil is oxidized on the coating, the coating should be heated at a temperature higher than 400° C. to burn out the oil within one hour while the oil cannot be burnt out at 380° C. within 5 hours. In addition, the coating tends to be flawed.

In the above U.S. Patent, the catalyst comprising 10.33% by weight of manganese, 1.21% by weight of cobalt and 0.72% by weight of nickel was carried on a carrier comprising 47.4% by weight of cerium oxide, 25.4% by weight of lanthanum oxide, 13.9% by weight of neodymium oxide, 5.6% by weight of praseodymium, 6.4% by weight of samarium oxide, 2% by weight of yttrium oxide and 1.7% by weight of gadolinium oxide.

SUMMARY OF THE INVENTION

One object of the present invention is to provide a novel mixed oxide.

Another object of the present invention is to provide a coating comprising a novel mixed oxide.

Further object of the present invention is to provide a porous material comprising a novel mixed oxide.

These and other objects of the present invention is accomplished by a mixed oxide comprising oxides of Ce, Cu and Mn wherein an atomic ratio of Ce to a total atom number of Cu and Mn is from 1:2 to 2:1 and the metals are present in the mixed oxide in the oxide forms of $CeO_2$ and $Cu_xMn_{3-x}O_4$ wherein x is a number larger than 0 (zero) and less than 3, and a coating or a porous material comprising said mixed oxide.

When the coating or the porous material is applied on surfaces of the cooking utensils, the adhered organic stains can be decomposed and removed through the catalytic activity of the mixed oxide at a relatively low temperature.

DETAILED DESCRIPTION OF THE DRAWINGS

First, the synthesis of the mixed oxide comprising oxides of Ce, Cu and Mn is explained.

As starting materials, salts such as nitrates or sulfates of Ce, Cu and Mn are preferably used. The atomic ratio of Ce, Cu and Mn in the raw material mixture is determined according to the intended atomic ratio of the metals in the mixed oxide to be produced. Then, the mixed oxide is prepared by a coprecipitation method as follows:

The nitrates and/or sulfates of the metals are weighed in such amounts that the atomic ratio of the metals is fulfilled and dissolved in an ion-exchanged or distilled water. The concentration of all the metal salts in the prepared aqueous solution is from 0.1M to 2M, preferably less than 1M. Then, the metal salts are precipitated by the addition of an aqueous solution of an alkali such as NaOH or $Na_2CO_3$. Among the alkalis, NaOH is preferred since it provides the mixed oxide having a higher oxidation activity. The concentration of the aqueous solution of alkali is preferably close to that of the metal salts solution, and the alkali is added in an amount of 1.5 to 2 times equivalents to that of the three metal elements. The coprecipitated material is filtered and washed with water while avoiding contact with the air to remove the excessive alkali ions. Then, the material is dried at an elevated temperature, for example, around 40° C. to evaporate water off and calcined. The calcination temperature is preferably from 450° to 650° C.

According to the above general method but changing the sintering temperature, two mixed oxides A and B in both of which the atomic ratio of Ce:Cu:Mn was 1:0.3:0.7 were prepared. The sintering temperature was 450° C. and 650° C. for the mixed oxides A and B, respectively.

In the same manner as above, each oxide of Ce, Cu and Mn was prepared with the sintering temperature of 450° C.

Figure 1:
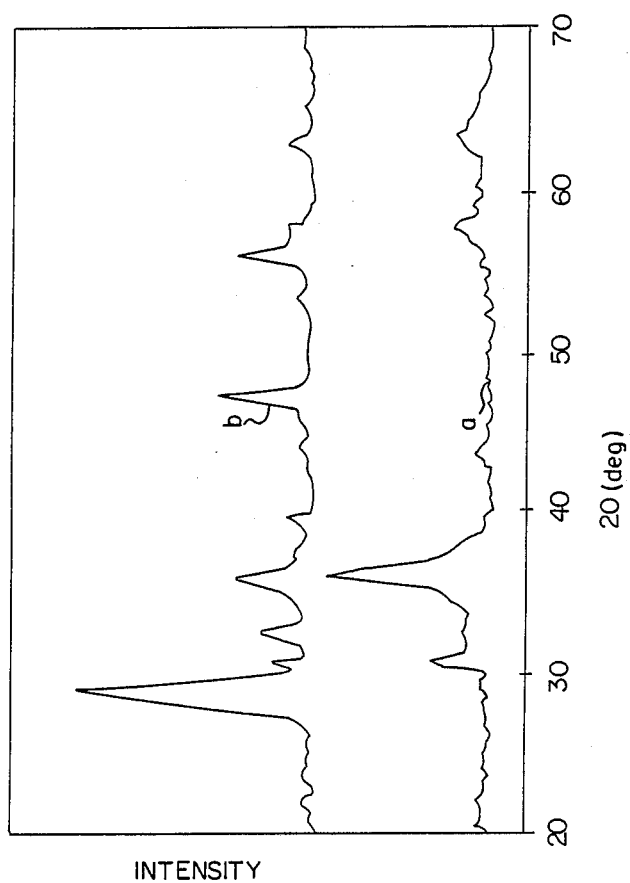
FIG. 1 shows the X-ray diffraction patterns of the mixed oxide of the present invention.
Figure 2:
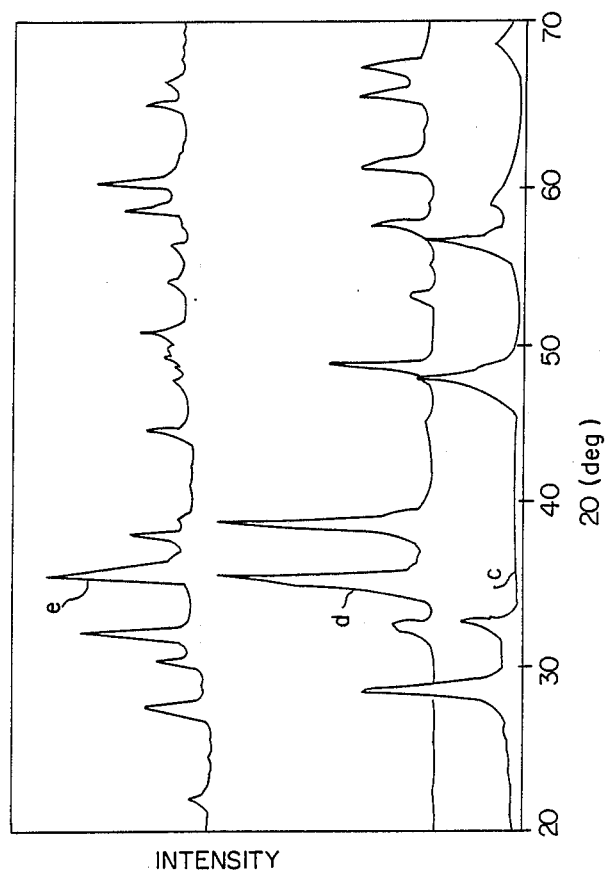
FIG. 2 shows the X-ray diffraction patterns of the oxides of Ce, Cu and Mn.

The X-ray diffraction patterns of the mixed oxide A and B are shown in FIG. 1, in which the patterns "a" and "b" correspond to the mixed oxides A and B, respectively. The X-ray diffraction patterns of the oxides of Ce, Cu and Mn are shown in FIG. 2, in which the patters "c", "d" and "e" correspond cerium oxide, copper oxide and manganese oxide, respectively.

The X-ray diffraction patterns of FIG. 1 indicate that the mixed oxides comprise the mixture of $CeO_2$ and $Cu_xMn_{3-x}O_4$ (hereinafter referred to as "$CeO_2.Cu_xMn_{3-x}O_4$"). The patterns of FIG. 2 indicate that the oxides are $CeO_2$, $CuO$ and $Mn_2O_3$.

The mixed oxides were prepared by changing the atomic ratio of Ce:(Cu+Mn) to 1:1 and sintering the precipitated salts at 450° C. When the atomic ratio of Cu to Mn was varied and the X-ray diffraction patterns of the mixed oxides were recorded, it was found that the oxides of excessive copper and manganese, namely $CuO$ and $Mn_2O_3$ were present when the atomic ratio of copper to manganese was outside the range from 1:4 to 1:1 (from 0.2:0.8 to 0.5:0.5).

Figure 3:
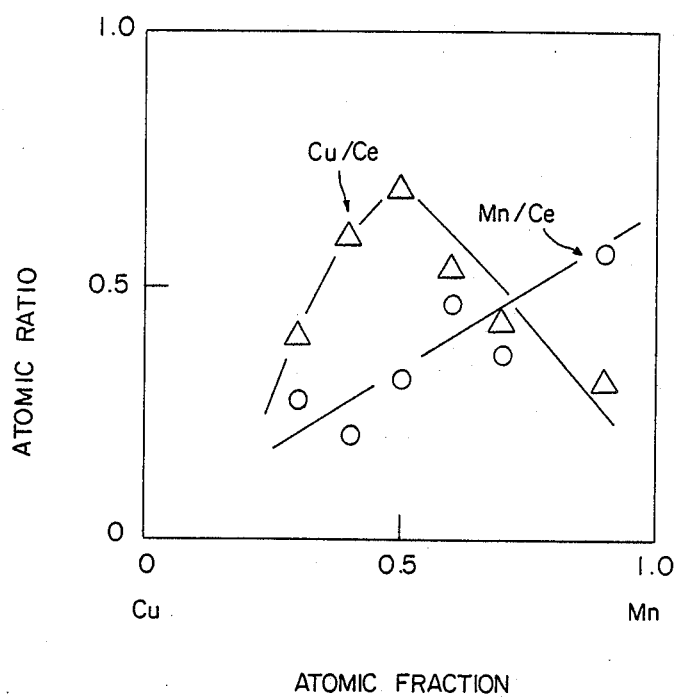
FIG. 3 shows the ratio of the concentrations of Cu and Mn in the surface of $CeO_2 \cdot Cu_xMn_{3-x}O_4$ measured by ESCA, FIG. 4 schematically shows the structure of $CeO_2 \cdot Cu_xMn_{3-x}O_4$.

FIG. 3 shows the ratio of the concentrations of Cu and Mn in the surface of $CeO_2.Cu_xMn_{3-x}O_4$ sintered at 450° C. measured by ESCA. Around the Cu:Mn ratio of 0.3:0.7, the ratio of the Cu and Mn concentration in the surface is 1:1. When the Cu:Mn concentration ration in the surface is about 1:1, the oxide of Cu and Mn seems to have an oxide form closed to $Cu_{1.5}Mn_{1.5}O_4$. However, since the sintering temperature was as low as 450° C. and the crystallinity was low, the oxide is not the grown crystal of $Cu_{1.5}Mn_{1.5}O_4$. This is confirmed from the intensities of the X-ray diffraction pattern in FIG. 1.

The surface areas of the oxides measured by the BET method are summarized in Table 1.

TABLE 1

| Oxide | Surface area ($m^2/g$) | Mixed oxide | Surface area ($m^2/g$) |
|---|---|---|---|
| $CeO_2.Cu_xMn_{3-x}O_4$ | 153 | $(La.Cu.Mn)O_x$ | 82 |
| $CeO_2$ | 118 | $(Sm.Cu.Mn)O_x$ | 68 |
| $CuO$ | 90 | $(Nd.Cu.Mn)O_x$ | 71 |
| $Mn_2O_3$ | 77 | $(Pr.Cu.Mn)O_x$ | 72 |
| $CeO_2.Cu_xMn_{3-x}O_4$(*1) | 180 | | |

Note: (*1) Prepared by using $Na_2CO_3$

Table 1 includes the surface areas of the mixed oxides comprising La, Sm, Nd or Pr in place of Ce. But, the surface areas of such mixed oxides are smaller than that of $CeO_2.Cu_xMn_{3-x}O_4$. From these results, it is understood that the presence of cerium contributes to the increase of surface area of the mixed oxide.

Figure 4:
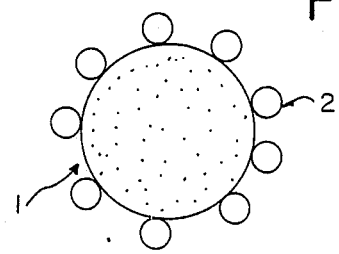

Conceptually, the structure of $CeO_2.Cu_xMn_{3-x}O_4$ may be as shown in FIG. 4, in which $Cu_xMn_{3-x}O_4$ particles 2 are densely dispersed on the surface of $CeO_2$ particle 1.

The oxidation of organic compounds with the mixed oxide of the present invention is now explained. Only for the purpose of explanation, a commercially available salad oil is used as the organic material, although the mixed oxide of the present invention can be used to oxidize other organic materials.

Figure 5:
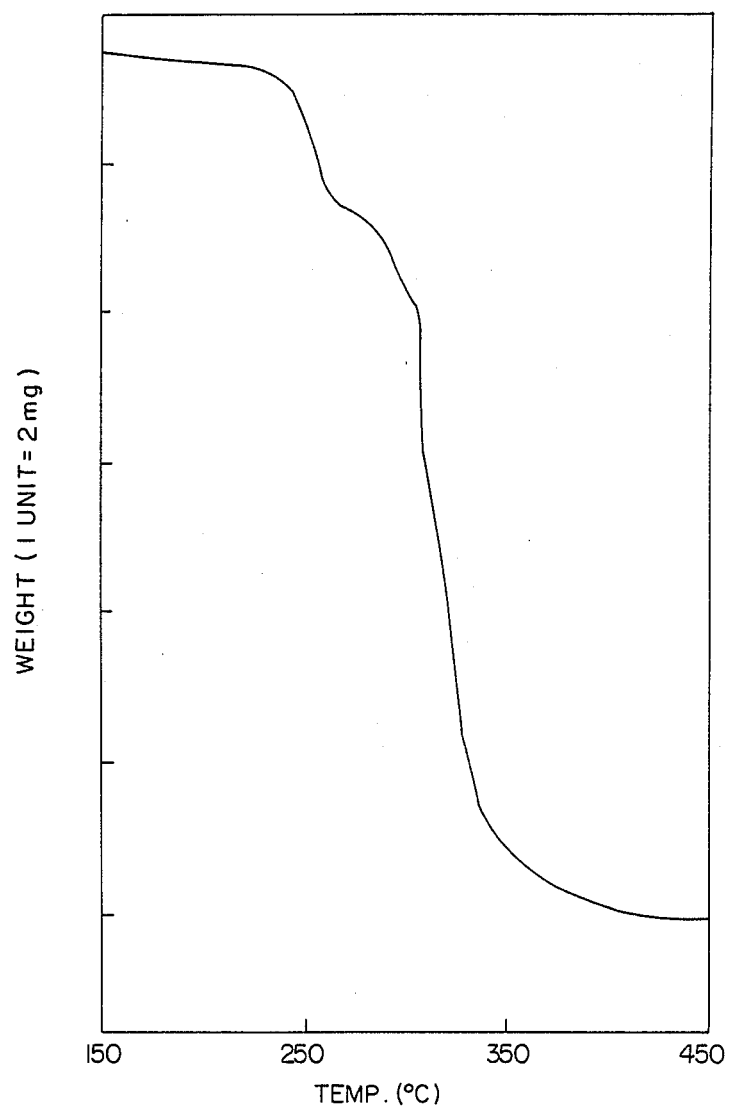
FIG. 5 shows one example of the measured TG.

Powder of the oxide shown in Table 2 (10 mg) and the salad oil (25 mg) were mixed. The mixture (15 mg) was charged in a cell for DTA (differential thermal analysis) and thermogravimetric change (TG) was measured to evaluate the oxidation performance of the oxides. FIG. 5 shows an example of the TG. Table 2 includes the temperatures at which the gravity change was decreased to 0 (zero), namely the temperature at which the salad oil was completely decomposed for various oxides, which were prepared by the above described coprecipitation method.

TABLE 2

| Oxide | Temperature (°C.) | Oxide | Temperature (°C.) |
|---|---|---|---|
| $CeO_2.Cu_xMn_{3-x}O_4$ | 410 | $Co_2O_3$ | 490 |
| $CeO_2$ | 462 | $NiO$ | 500 |
| $CuO$ | 456 | $LaCoO_3$ | 476 |
| $Mn_2O_3$ | 432 | $BaTiO_3$ | 495 |
| $CeO_2.Cu_xMn_{3-x}O_4$(*1) | 452 | $MoO_3$ | 500 |

Note: (*1) Prepared by using $Na_2CO_3$.

From the results of Table 2, the mixed oxide of the present invention seems to have beneficial oxidation performance.

The mixed oxide of Ce, Cu and Mn prepared by using $Na_2CO_3$ had the large surface area but it was a simple mixture of the oxides of Ce, Cu and Mn as understood from the X-ray diffraction pattern of FIG. 1 and no $Cu_xMn_{3-x}O_4$ structure was detected. This mixed oxide had inferior oxidation performance to the mixed oxide prepared by using NaOH. These results indicate the advantageous contribution of the $Cu_xMn_{3-x}O_4$ structure to the oxidation of the organic material.

Now, the coating of the porous layer structure comprising the mixed oxide of the present invention will be explained.

First, the coating is explained. The mixed oxide powder is dispersed in a binder such as aluminum phosphate, silicates having low soda contents, polyborosiloxane, polyborotitanosiloxane, silicone resins and the like to prepare a coating composition. The amount of the mixed oxide is 10 to 50 parts by weight per 100 parts of the binder. The coating composition may contain other oxides such as $SiO_2$, $Al_2O_3$, $TiO_2$, $ZrO_2$ and the like. Among them, $SiO_2$ is preferred, since it can be added in the form of quartz glass powder and increase the hardness of the coating. Typical compositions are shown in Table 3, in which "parts" are "by weight".

TABLE 3

| No. | Binder (parts) | Oxides (parts) | Baking temp (°C.) | Film thickness ($\mu m$) |
|---|---|---|---|---|
| 1 | Aluminum phosphate (100) | $CeO_2.Cu_xMn_{3-x}O_4$ (50) $SiO_2$ (20), $Al_2O_3$ (20) | 350 | 200 |
| 2 | Silicate (100) | $CeO_2.Cu_xMn_{3-x}O_4$ (25) $SiO_2$ (10), $Al_2O_3$ (10) | 350 | 200 |
| 3 | Silicone resin (100) | $CeO_2.Cu_xMn_{3-x}O_4$ (50) $SiO_2$ (20), $Al_2O_3$ (20) | 350 | 50 |
| 4 | Silicate (80) Silicone resin (20) | ↑ | 350 | 200 |
| 5 | Polyborosiloxane (100) | $CeO_2.Cu_xMn_{3-x}O_4$ (30) $SiO_2$ (30), $Al_2O_3$ (20) | 450 | 20 |
| 6 | ↑ | ↑ | 650 | 15 |
| 7 | Polyborosiloxane (80) Polyborotitanosiloxane (20) | ↑ | 450 | 20 |
| 8 | ↑ | ↑ | 650 | 15 |

Note: $SiO_2$ used was quartz glass powder.

The baking temperature of the coating composition depends on the kind of binder. For example, the baking temperature is from 300° to 400° C. in case of aluminum phosphate, silicate and the silicone resin, and from 400° to 700° C. in case of polyborosiloxane and polyborotitanosiloxane.

The thickness of the baked coating is not critical. Usually, it is from 10 to 500 μm, preferably from 10 to 300 μm in case of the cooking utensils.

To evaluate the oxidation performance of the coating, the coating was formed on a plate of stainless steel (SUS 304) having a thickness of 0.5 mm. On the coating a small amount of the salad oil was dropped and heated in an electric oven at 350° C., 380° C. or 400° C. for 1, 2 or 3 hours. The results are shown in Table 4, in which "O" stands for the case where the salad oil completely disappeared and "X" stands for the case where the salad oil remained on the surface in the tar-like form.

TABLE 4

| Temp (°C.) | Time (hour) | \multicolumn{8}{c}{No.} | | | | | | | |
|---|---|---|---|---|---|---|---|---|---|
| | | 1 | 2 | 3 | 4 | 5 | 6 | 7 | 8 |
| 350 | 1 | X | X | X | X | X | X | X | X |
| | 2 | X | X | X | X | X | X | X | X |
| | 3 | X | O | X | X | X | X | X | X |
| 380 | 1 | X | X | X | X | X | X | X | X |
| | 2 | X | O | X | X | O | O | O | O |
| | 3 | X | O | X | O | O | O | O | O |
| 400 | 1 | X | O | X | X | O | O | O | O |
| | 2 | X | O | X | O | O | O | O | O |
| | 3 | X | O | X | O | O | O | O | O |

During heating at the above temperatures, the salad oil was changed to a black gummy material in 10 to 30 minutes and then tarred and decomposed as time passed.

In general, the rate of such change depends on the kind of coating. For example, on a coating having a small surface energy such as polytetrafluoroethylene (Teflon, trade mark), the dropped salad oil does not sufficiently spread over the coating and becomes tar in a drop form. In such state, the salad oil is hardly decomposed even at 400° C. or very slowly decomposed. On the contrary, on a porous inorganic coating having good affinity with the salad oil and a large surface area which contacts to the salad oil, the salad oil can spread over the heated coating and is easily oxidized. The temperature at which the oxidation is completely finished depends on the surface structure and oxidation performance of the coating. When the porosity of the coating is increased to render the surface structure advantageous for the reaction, strength of the coating is deteriorated. Among the coatings in Table 4, the coating strength of those comprising aluminum phosphate and silicate as the binders are weak. The silicone resin is less preferred as the binder for the coating on which the organic materials such as the salad oil are decomposed, since its heat resistance is comparatively low and its surface energy is small. Polyborosiloxane or polyborotitanosiloxane is suitable as the binder to produce a coating containing the catalyst, since such the binder provides a coating which is harder and more dense than the coating comprising aluminum phosphate or silicate and is a porous film having micropores in the micron order. On such porous coating, the salad oil can be burnt out at 380° C. for about 3 hours. Therefore, such coating can be used in a commercially available electric oven having a pyrolysis sequence of 3 hours at about 450° C. The conventional electric oven has a heat resistant porcelain enamel coating applied on an inner wall for the pyrolysis of oily stains. However, the porcelain enamel coating has no oxidation activity. The coating of the present invention comprising the polyborosiloxane or polyborotitanosiloxane will be used as a substitute for the porcelain enamel coating.

The coating of the present invention preferably has a pH value in a neutral range. In case of the coating comprising aluminum phosphate which has a pH in an acidic range, the generated tar-like material adhered to the inside of the coating, while in case of the coating comprising silicate has a pH in an alkaline range, the tar is more hardly adhered to the coating when the alkalinity of the coating is larger. When the pH of the coating is adjusted with an additive, the oxidation performance is maximum at pH of 7 to 8. The pH value of the coating is measured in a dispersion of 0.15 g of the coating material in 3 ml of distilled water after boiling the aqueous dispersion for 30 minutes. The pH of the coating can be adjusted by the addition of solid acids or bases. Preferably, both the acid and the alkali are required for the oxidation of organic materials, since donation and acceptance of electrons are established among the acid, the alkali and the organic material.

In view of the hardness, durability including the adhesivity, and the oxidation performance, polyborosiloxane and polyborotitanosiloxane are the practically preferred binders for the coating comprising the mixed oxide according to the present invention.

Figure 6:
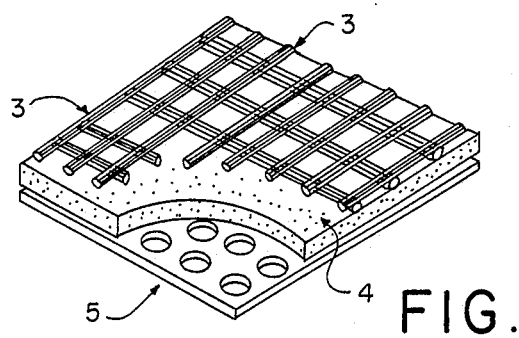
FIG. 6 is a partly cut-out perspective view of the composite material comprising the mixed oxide of the present invention, FIG. 7 schematically shows a cross section of an electric oven.

To provide a new surface of the cooking utensil, the mixed oxide of the present invention can be dispersed and carried on a woven or non-woven ceramic fabric and composited with a reinforcing metal plate. FIG. 6 is a partly cut-out perspective view of such composite material. The composite material of FIG. 6 consists of a long fiber fabric 3 comprising SiC, a non-woven fabric comprising $SiO_2$ and $Al_2O_3$ fibers and a metal support 5 having ventilation holes. The mixed oxide of the present invention is carried in the woven fabric 3 and the non-woven fabric 4. By using such composite material, the liquid organic materials or organic materials which are liquefied by heating can be completely oxidized at 300° C. This is because the woven and non-woven fabrics 3 and 4 have large porosities, for example, the non-woven fabric has the void of about 70% on the average, so that the oxygen required for oxidation is well supplied, and the fabrics provide reaction areas over which the organic materials can spread. The composite material have better oxygen supplying ability than the single layer of the mixed oxide coating. Therefore, the oxidation temperature can be lowered.

The method for producing the composite material of FIG. 6 will be explained.

Before carrying the mixed oxide on the woven fabric 3, a surface treatment agent such as epoxy resins is removed by heating the fabric at a temperature of 500° C. or higher. After cooling, an aqueous solution of the salts of cerium, copper and manganese (for example, the aqueous solution used in the coprecipitation method) is spray coated on the fabric, dried at 80° C., gradually heated to 450° C. and then kept standing at 450° C. for one hour. The carried amount of the mixed oxide is proportional to the amount of coated salts and the number of coatings. The mixed oxide of the present invention can be carried on the non-woven fabric 4 in the same manner as above. The non-woven fabric is also pretreated at a temperature of 500° C. or higher. More preferably, the mixed oxide is carried on the non-woven fabric 4 as follows:

When the non-woven fabric is produced from the SiO$_2$ and Al$_2$O$_3$ fibers in the similar manner to the paper making, the mixed oxide powder prepared by the coprecipitation method is dispersed in the fiber and then the non-woven fabric carrying the mixing oxide is produced. By this method, the mixed oxide is uniformly dispersed in the non-woven fabric.

The woven fabric, the non-woven fabric and the perforated metal plate are laminated as shown in FIG. 6 and only the edge portions are fixed.

Figure 7:
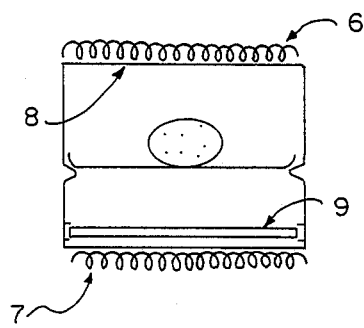

Since the mixed oxide of the present invention and the coating or porous material comprising said mixed oxide have high oxidation activity, they were applied in the commercially available electric oven which had a pair of flat heaters installed in the upper and lower parts of the oven. As shown in FIG. 7 which schematically shows a cross section of the electric oven, the coating 8 was formed on the surface of the upper heater 6 and the composite material 9 of FIG. 6 was installed on the lower heater 7. The outputs of the upper and the lower heaters were 900 W and 300 W, respectively. The temperature on the surface of the upper heater was from 400° to 500° C., although it might be about 300° C. at some edge parts of the heater due to non-uniform temperature distribution. The temperature on the surface of the composite material was from 300° to 350° C. Under such temperature conditions, the salad oil was sprayed on the surfaces of the coating 8 and the composite material 9. On the upper heater side, the salad oil was removed except the edge parts at 300° C. Also, on the lower heater side, the salad oil was removed. The removal of salad oil took 2 to 3 hours on the surface of the upper heater at comparatively low temperature. On the lower heater, it took only 20 to 30 minutes.

Although, the coating was formed on the upper heater in the above embodiment, it is possible to form the coating on all the inner walls of the oven. When all the inner walls are covered by the coating, the heater power should be increased to increase the temperature of the both sides and rear side.

What is claimed is:

1. A mixed oxide catalyst comprising oxides of Ce, Cu and Mn wherein an atomic ratio of Ce to a total atom number of Cu and Mn is from 1:2 to 2:1 and the metals are present in the mixed oxide in the oxide forms of CeO$_2$ and Cu$_x$Mn$_{3-x}$O$_4$ wherein x is a number larger than 0 (zero) and less than 3.

2. The mixed oxide catalyst according to claim 1, wherein the atomic ratio of Cu to Mn is from 1:4 to 1:1.

3. A catalytic coating formed on a substrate which comprises a mixed oxide catalyst comprising oxides of Ce, Cu and Mn in which an atomic ratio of Ce to a total atom number of Cu and Mn is from 1:2 to 2:1 and the metals are present in the mixed oxide in the oxide forms of CeO$_2$ and Cu$_x$Mn$_{3-x}$O$_4$ wherein x is a number larger than 0 (zero) and less than 3.

4. The coating according to claim 3, which further comprises at least one oxide selected from the group consisting of SiO$_2$ and Al$_2$O$_3$.

5. A porous catalytic material which comprises a carrier selected from the group consisting of woven fabric and non-woven fabric and a mixed oxide comprising oxides of Ce, Cu and Mn in which an atomic ratio of Ce to a total atom number of Cu and Mn is from 1:2 to 2:1 and the metals are present in the mixed oxide in the oxide forms of CeO$_2$ and Cu$_x$Mn$_{3-x}$O$_4$ wherein x is a number larger than 0 (zero) and less than 3 which mixed oxide is supported on the carrier.

6. A composite catalytic material which comprises a porous material comprising a carrier selected from the group consisting of woven fabric and non-woven fabric and a mixed oxide comprising oxides of Ce, Cu and Mn in which an atomic ratio of Ce to a total atom number of Cu and Mn is from 1:2 to 2:1 and the metals are present in the mixed oxide in the oxide forms of CeO$_2$ and Cu$_x$Mn$_{3-x}$O$_4$ wherein x is a number larger than 0 (zero) and less than 3 which mixed oxide is supported on the carrier, and a metal plate on which said porous material is laminated.

7. The composite catalytic material according to claim 6, wherein the metal plate has ventilation holes.

8. A catalytic coating according to claim 3 in which the substrate is metal.

* * * * *